United States Patent
Wilson

[11] Patent Number: 6,076,905
[45] Date of Patent: Jun. 20, 2000

[54] INPUT DEVICE ENCLOSURE

[75] Inventor: Mitch D. Wilson, Meridian, Id.

[73] Assignee: Micron Electronics, Inc., Nampa, Id.

[21] Appl. No.: 09/009,628

[22] Filed: Jan. 20, 1998

[51] Int. Cl.[7] .................................................. A47B 81/00
[52] U.S. Cl. ................................ 312/223.2; 312/223.1; 312/208.3; 248/551
[58] Field of Search ........................... 312/223.1, 223.2, 312/223.3, 140.4, 215, 280, 281, 208.1, 208.3; 108/26, 50.02, 90, 91, 93; 248/917, 918, 551; 70/58, 164, 163, 166

[56] References Cited

U.S. PATENT DOCUMENTS

| | | | |
|---|---|---|---|
| 1,315,794 | 9/1919 | Richards | 312/208.3 |
| 4,294,496 | 10/1981 | Murez | 312/208.3 |
| 4,570,156 | 2/1986 | Nicholas, Jr. | 248/551 X |
| 4,600,249 | 7/1986 | Anderson | 312/223.3 |
| 4,624,510 | 11/1986 | Jedziniak | 248/917 X |
| 4,636,781 | 1/1987 | Wills et al. | 312/233.2 X |
| 4,786,120 | 11/1988 | Sparks et al. | 312/208.3 |
| 4,898,009 | 2/1990 | Lakoski et al. | 70/58 |
| 5,022,242 | 6/1991 | Povilaitis | 70/163 X |
| 5,660,451 | 8/1997 | Glynn | 312/223.2 |
| 5,725,194 | 3/1998 | Glynn | 70/58 X |
| 5,816,076 | 10/1998 | Biedermann et al. | 70/164 X |

FOREIGN PATENT DOCUMENTS

| | | | |
|---|---|---|---|
| 2587872 | 3/1987 | France | 312/208.3 |
| 2647067 | 11/1990 | France | 248/551 |
| 1293826 | 10/1972 | United Kingdom | 312/208.3 |

*Primary Examiner*—Peter M. Cuomo
*Assistant Examiner*—James O. Hansen
*Attorney, Agent, or Firm*—Joseph W. Holland

[57] ABSTRACT

An apparatus for enclosing an input device for a semiconductor device assembly machine including a cover configured having a cavity. The cover is configured to be placed over the input device bearing on a support surface upon which the input device is placed. The input device enclosure may also include a support surface engaging for securing the input device and limiting access to the input device. The input device enclosure may be configured as a stand alone unit or it may be incorporated with other processing device components or features. The input device enclosure may also include a looking device for securing the cover to the support surface for securing the input device and limiting access to the input device.

3 Claims, 3 Drawing Sheets

INPUT DEVICE ENCLOSURE

BACKGROUND

1. Technical Field

This invention relates generally to the field of printed circuit board assembly, and more specifically, to an apparatus and method for securely enclosing an input device during the maintenance and calibration of semiconductor assembly devices.

2. Background of the Invention

Integrated and discrete components are commonly assembled onto printed circuit boards (PCBs). A variety of manufacturing processes occur during printed circuit board assembly including board screening, part placement and part attachment. Each of these assembly steps employ electronics manufacturing process devices including manufacturing devices, process devices and assembly devices which are commonly operated and controlled by computer. Each of the devices require routine maintenance and calibration.

Typically, during maintenance and calibration the assembly device may be operated in a manual or override mode with maintenance personnel accessing various mechanical and electrical systems within the device. During these operations, as a safety requirement, maintenance personnel de-energize the operating system in order to eliminate any possibility of input to the device's processing unit which would result in unwanted device operation.

What is needed is an apparatus and method for securely enclosing an input device during the maintenance and calibration of semiconductor assembly devices eliminating the need to de-energize the operating system during maintenance operations.

SUMMARY OF THE INVENTION

According to one embodiment of the present invention, an input device enclosure includes a cover configured having a cavity. The cover is further configured to be placed over an input device bearing on a support surface upon which the input device is placed. The input device enclosure may also include a support surface engaging member for securing the input device and limiting access to the input device. The input device enclosure may be configured as a stand alone unit or it may be incorporated with other processing device components or features. The input device enclosure may also include a means for securing the cover to the support surface for securing the input device and limiting access to the input device.

In another embodiment of the invention, the support surface includes a base including a base plate for supporting the input device and a cover configured to be removably engageable with the base for enclosing the input device.

The cover of the input device enclosure has a shell portion and a base engaging portion. The shell portion may be manufactured in a variety of configurations including a segment of nearly any shape or as a plurality of interconnected planar segments so long as the configuration presents an inner cavity which serves to at least partially enclose the input device in use. In one embodiment of the invention, the shell portion includes a first sidewall, a second sidewall, a top panel and a front panel. The base engaging portion may be designed to engage with the base in such a manner that insures that the cover will remain positioned over the base during use, while maintaining a distance between the interior surfaces of the cover and the enclosed input device. Alternately, the base may incorporate within its design a cover engaging portion, or each of the cover and the base may be configured having cooperating members which engage to insure that the cover remains positioned over the base during use.

In one embodiment of the invention, the cover also may include a face panel which attaches to the top panel at a juncture located at the rear marginal edge of the top panel extending above the top panel. The base may include both a base plate for supporting the input device and an upright which attaches to the base at a juncture located at the rear marginal edge of the base plate. In use, the upright forms effectively a fourth or rear side to the cover, providing full enclosure of the input device.

In one embodiment of the invention, the locking device for securing the cover to the base includes a padlock which is secured through a pair of corresponding holes, one located in the cover and one located in the base. The locking device may also comprise a tag, strap or other means for securing the cover over the input device and indicating that the input device is inaccessible.

Other advantages will become apparent to those skilled in the art from the following detailed description read in conjunction with the appended claims.

It should be understood that the referenced drawings are not to scale and are intended as representations. The drawings are not necessarily intended to depict the functional and structural details of the invention, which can be determined by one of skill in the art by examination of the descriptions and claims provided herein.

DETAILED DESCRIPTION OF THE INVENTION

Figure 1:
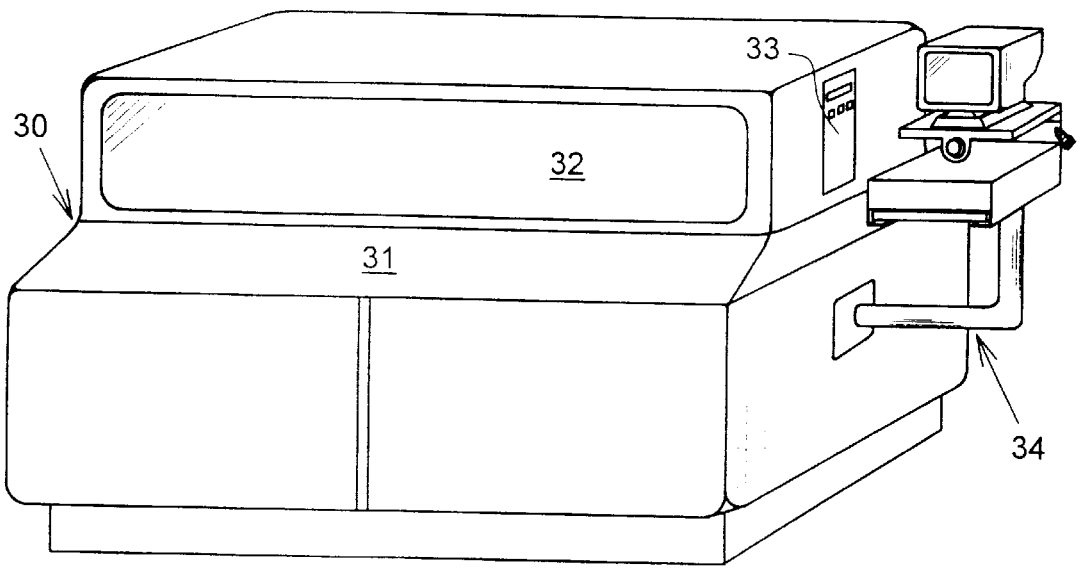
FIG. 1 is a perspective representational view of a machine employed in semiconductor device assembly.

Referring now to FIGS. 1 through 7, the present invention will be more fully described. FIG. 1 is a perspective representational view of a processing device employed in semiconductor device assembly shown in this case as stencil printer 30. Stencil printer 30 includes machine housing 31 having windows 32 which permit an operator to observe device operations and functions. Stencil printer 30 also includes operation panel 33 which houses a CPU (not shown). Operation pedestal 34 attaches to and extends from stencil printer 30 and includes monitor support 35, supported by arm 36. Monitor 37 is supported atop monitor support 35. Monitor 37 and an input device are operatively connected to the CPU. In this case the input device is depicted as mouse 38, although other input devices are oftentimes employed to permit an operator to interface with the processing device, including a variety of joysticks. Monitor support 35 may include platform tilt control 39 for adjusting the viewing angle of monitor 37.

Input device enclosure 10, as shown in FIGS. 2 through 7 may include base 11 attached to arm 36. Base 11 includes base plate 12 and upright 13 which attaches to base 11 at a juncture located at the rear marginal edge of base plate 11 and the lower end of upright 13. In the embodiment of the invention shown in FIGS. 1 through 4, the uppermost marginal edge of upright 13 attaches to the rear marginal edge of monitor support 35.

Figure 4:
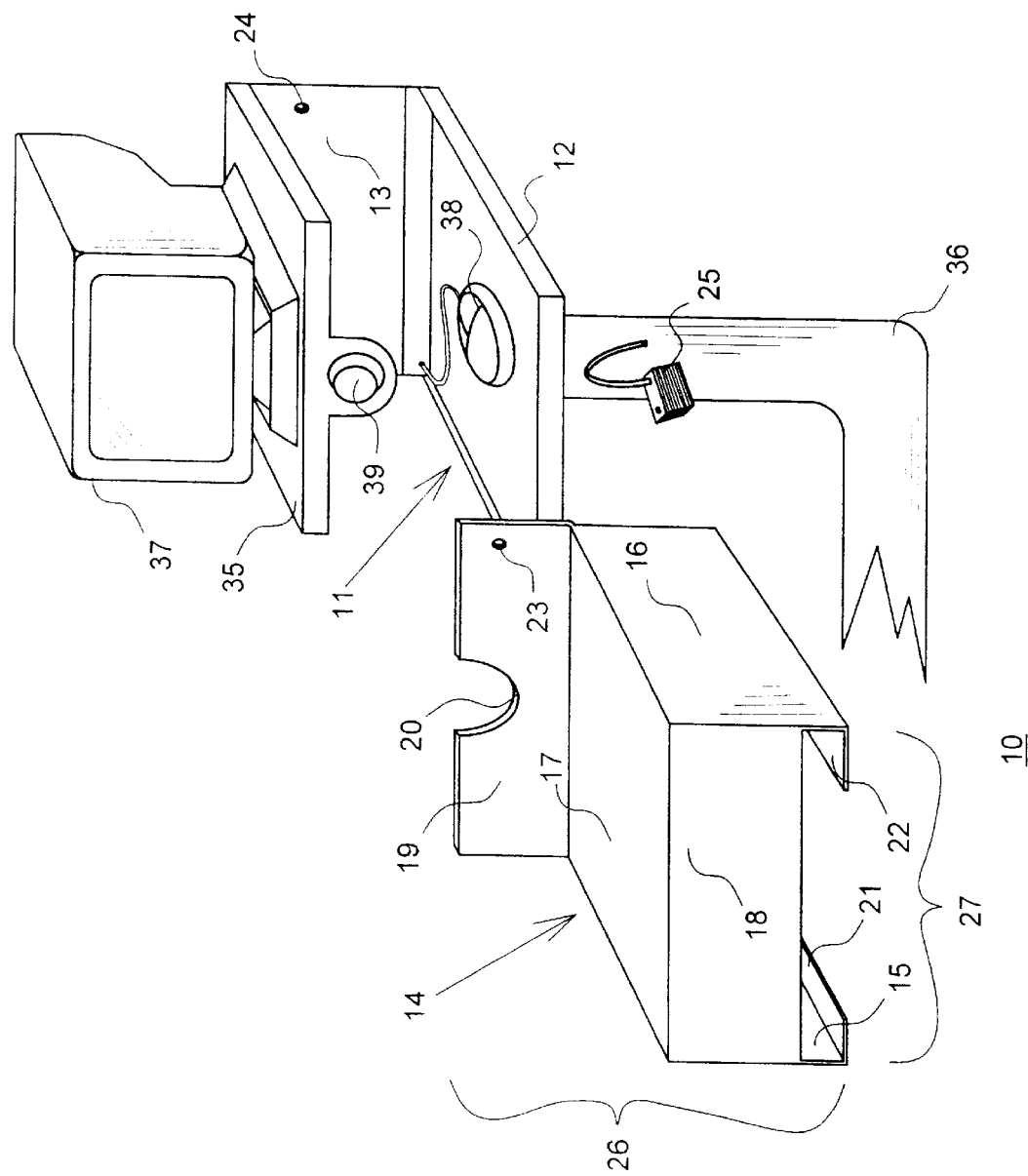
FIG. 4 is a perspective representational view of an input device and monitoring station for a machine employed in semiconductor device assembly showing one embodiment of the input device enclosure.

Also as shown in FIG. 4, cover 14 includes shell portion 26 and base engaging portion 27. Shell portion 26 includes first sidewall 15, second sidewall 16 and top panel 17. Base engaging portion 27 includes first sidewall flange 21 which extends below cover 14 and inward from first sidewall 15 and second sidewall flange 22 which extends below cover 14 and inward from second sidewall 16.

Cover 14, as shown in FIGS. 4 through 7, also includes front panel 18 and face panel 19. Face panel 19 attaches to top panel 17 at a juncture located at the rear marginal edge of top panel 17 extending above and substantially perpendicular to top panel 17. In the embodiment depicted in FIGS. 4, 5 and 6, face panel 19 includes cutaway 20 which permits clearance for platform tilt control 39.

Figure 5:
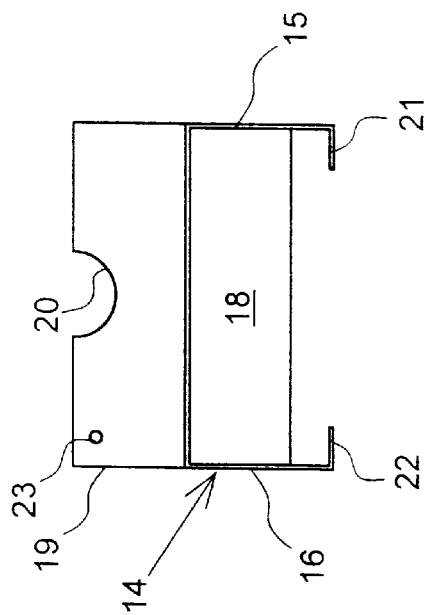
FIG. 5 is a rear view of one embodiment of the input device enclosure.
Figure 6:
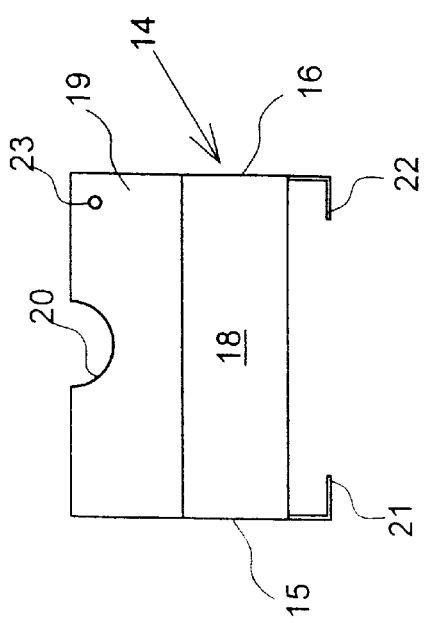
FIG. 6 is a front view of one embodiment of the input device enclosure.
Figure 7:
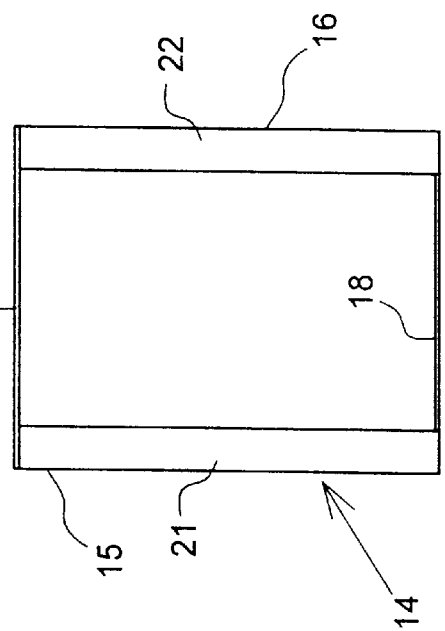
FIG. 7 is a bottom view of one embodiment of the input device enclosure.

As shown in FIGS. 4, 5 and 6, cover has first aperture 23 formed in face panel 19. Similarly, upright 13 has second aperture 24 formed through its cross section which aligns with first aperture 23 formed in face panel 19. Padlock 25 may be secured through first aperture 23 and second aperture 24 thereby securing cover 14 to base 11.

Figures 2, 3:
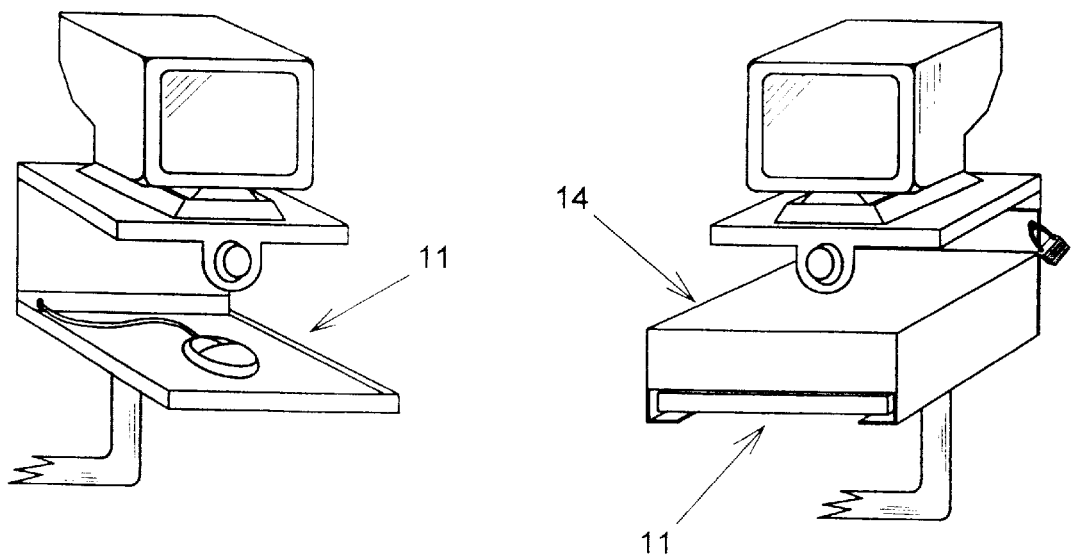
FIG. 2 is a perspective representational view of an input device and monitoring station for a machine employed in semiconductor device assembly.
FIG. 3 is a perspective representational view of an input device and monitoring station for a machine employed in semiconductor device assembly.

In use, cover 14 slides over base 11 with first sidewall flange 21 and second sidewall flange 22 fitting against the lower face of base plate 12. As shown in FIG. 3, cover 14 slides over base 11 until face panel 19 abuts against upright 13. In this engaged position, the lower edge of front panel 18 lies on the top surface of base plate 12, and the inner surfaces of first sidewall 15 and second sidewall 16 abut the side faces of base plate 12. This configuration allows for a distance to be maintained between the interior surfaces of cover 14 and mouse 38 thereby eliminating any possibility of unwanted machine input during maintenance operations.

Also in this engaged position, first aperture 23 is substantially aligned with second aperture 24 and the clasp of padlock 25 may be fit through first aperture 23 and second aperture 24.

While this invention has been described with reference to the described embodiments, this is not meant to be construed in a limiting sense. For instance, the invention is not restricted to a particular material or configuration of material. The cover may engage with the base as a result of a variety of configurations known to those skilled in the art. The means for securing the cover to the base may include built in locking mechanisms or electromechanical locking devices. The means for securing the cover to the base may be located anywhere so long as movement of the cover relative to the base is achieved. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

I claim:

1. A system for securing an input device comprising:

a base having a base plate for supporting the input device; and a cover slideably and removably engageable with the base and configured to enclose the input device, wherein said cover further comprises a shell portion including a top panel, a first sidewall including a first sidewall lower marginal edge and a first sidewall upper marginal edge, the first sidewall upper marginal edge attached to the top panel at a first side marginal edge, a second sidewall including a second sidewall lower marginal edge and a second sidewall upper marginal edge, the second sidewall upper marginal edge attached to the top panel at a second side marginal edge, a front panel attached to the top panel at a front marginal edge and a face panel attached at and above a rear marginal edge of the top panel, the shell portion configured to position over the base and the input device; and a base engaging portion including a first sidewall flange attached to the first sidewall lower marginal edge and extending inward from the first sidewall, and a second sidewall flange attached to the second sidewall lower marginal edge and extending inward from the second sidewall, wherein said base further comprises an upright which attaches to the base plate at a juncture at a rear marginal edge of the base plate extending above and substantially perpendicular to the base plate and means for securing the upright to the face panel.

2. The system for securing an input device of claim 1 further comprising means for securing the cover to the base for securing the input device and limiting access to the input device.

3. The system for securing an input device of claim 2 wherein the means for securing the cover to the base further comprises:

the cover having a first aperture formed therein;

the base having a second aperture formed therein, the second aperture being located for substantially concentric alignment with the first aperture; and a locking device having a clasp portion for insertion through the first aperture and the second aperture.

* * * * *